United States Patent
Pozivilko et al.

(10) Patent No.: US 8,408,368 B2
(45) Date of Patent: Apr. 2, 2013

(54) CALIPER BRAKE

(75) Inventors: Peter J. Pozivilko, Saint Joseph, MI (US); Howard H. Baldeosingh, Stevensville, MI (US); Scott Alan McKamey, Three Oaks, MI (US); Hobart Gene McLaughlin, Jr., Eau Claire, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 456 days.

(21) Appl. No.: 12/657,542

(22) Filed: Jan. 22, 2010

(65) Prior Publication Data
US 2011/0180355 A1   Jul. 28, 2011

(51) Int. Cl.
*F16D 65/14* (2006.01)

(52) U.S. Cl. .................................................. 188/73.45

(58) Field of Classification Search ................. 188/72.1, 188/72.2, 72.3, 72.9, 73.1, 73.43, 73.44, 188/73.45, 171, 2 D
See application file for complete search history.

(56) References Cited

U.S. PATENT DOCUMENTS

| | | | | |
|---|---|---|---|---|
| 3,357,528 A | * | 12/1967 | Verlinde | 188/171 |
| 3,463,274 A | * | 8/1969 | Hollnagel et al. | 188/72.7 |
| 3,556,266 A | * | 1/1971 | McCarthy | 188/171 |
| 3,616,876 A | * | 11/1971 | Brooks | 188/73.45 |
| 4,022,301 A | * | 5/1977 | Hansen | 188/72.1 |
| 4,234,061 A | * | 11/1980 | Margetts et al. | 188/71.3 |
| 4,392,560 A | * | 7/1983 | Nakasu et al. | 188/73.34 |
| 5,186,287 A | * | 2/1993 | Lindner et al. | 188/171 |
| 5,507,369 A | * | 4/1996 | Ferreira et al. | 188/73.45 |
| 2010/0187048 A1 | * | 7/2010 | Chandler | 188/26 |

FOREIGN PATENT DOCUMENTS

| | | | | |
|---|---|---|---|---|
| JP | 59073633 A | * | 4/1984 | |
| JP | 59106731 A | * | 6/1984 | |

OTHER PUBLICATIONS

Drawing No. 87501 dated Sep. 22, 2006 of Ausco Products, Inc., Benton Harbor, MI (1 sheet).
Drawing No. 89260 dated Mar. 27, 2008 of Ausco Products, Inc., Benton Harbor, MI (1 sheet).

* cited by examiner

*Primary Examiner* — Robert A Siconolfi
*Assistant Examiner* — Stephen Bowes
(74) *Attorney, Agent, or Firm* — Renner, Kenner, Greive, Bobak, Taylor & Weber

(57) ABSTRACT

A caliper brake including a mounting bracket adapted to be secured to a vehicle. The mounting bracket includes a pair of laterally spaced holes, and a mounting bolt is received through each hole. Each bolt includes a head and a threaded portion on opposing ends, and a nut is received on each threaded portion. An inner spacer extends between the mounting bracket and the nut on each bolt, and an outer spacer extends between the mounting bracket and the head on each bolt.

8 Claims, 5 Drawing Sheets

CALIPER BRAKE

TECHNICAL FIELD

This invention relates to caliper brake having opposing stators adapted to engage a rotor, thereby providing a braking force. More particularly, this invention relates to such a caliper brake including a mounting bracket that improves brake performance and reduces uneven wear of the stators.

BACKGROUND ART

Caliper brakes are well known and widely used within the industrial equipment industry, as well as other industries, to provide a braking force on a vehicle. Caliper brakes may be provided in a variety of forms including, for example, mechanically, hydraulically or pneumatically actuated caliper brakes, and spring actuated and hydraulically released caliper brakes. Mechanically actuated caliper brakes may include, for example, cam actuating mechanisms and ball-ramp actuating mechanisms.

Caliper brake mounting assemblies suffer from a number of disadvantages. In some cases, in order to ensure proper functioning of the brake, minimal clearance must be provided between the mounting bracket and the brake components to which it is secured. This minimal clearance allows the brake assembly some freedom of motion relative to the mounting bracket. In many cases, the caliper brake will "droop" in the horizontal direction, causing the brake pads on the stator assemblies to rub the rotor. Over time, the rubbing of the brake pad on the rotor can cause uneven brake pad wear and a high pitch noise during non-braking.

In an attempt to overcome this problem the mounting bracket has also been located on one side of the brake assembly. However, such can often result in twisting of the brake assembly. Specifically, during braking, a dynamic rotating force induces a moment force between the braking components and the mounting bracket, and this force causes twisting. Inconsistencies in the rotor upon which the braking force is applied causes variances in the moment force acting on the mounting bracket, thereby causing twisting and untwisting of the brake. This repeated twisting and untwisting results in uneven brake pad wear and a low pitch noise during braking.

Thus, there is a need for a caliper brake having an improved mounting mechanism capable of overcoming one or more of the deficiencies discussed above.

DISCLOSURE OF THE INVENTION

It is thus an object of one aspect of the present invention to provide a caliper brake having an improved mounting mechanism.

It is an object of another aspect of the present invention to provide a caliper brake, as above, having a mounting bracket that is secured centrally within the brake.

It is an object of an additional aspect of the present invention to provide a caliper brake, as above, including spacers extending from both sides of the mounting bracket to stabilize the mounting bracket.

These and other objects of the present invention, as well as the advantages thereof over existing prior art forms, which will become apparent from the description to follow, are accomplished by the improvements hereinafter described and claimed.

In general, a caliper brake according to the concepts of the present invention includes a mounting bracket adapted to be mounted to a vehicle. A pair of laterally spaced holes extend through the mounting bracket and a pair of laterally spaced mounting bolts received through the holes. The bolts include a head and a threaded portion at opposing ends and a nut is secured on the threaded portion of each of the bolts. An inner spacer is positioned on each bolt and extends a majority of the axial distance between the mounting bracket and the nut. An outer spacer is positioned on each bolt and extends between the mounting bracket and the head of the bolt.

In accordance with another aspect of the present invention, a caliper brake includes a first stator assembly, a second stator assembly axially spaced from the first stator assembly, and a mounting bracket axially spaced from said second stator assembly in a direction opposite the first stator assembly. A stationary plate is axially spaced from the mounting bracket in a direction opposite the second stator assembly. A first hole and a laterally spaced second hole are provided in each of the first and second stator assemblies and the stationary plate and a third hole and a laterally spaced fourth hole are provided through each of the first and second stator assemblies, the mounting bracket and the stationary plate. A first bolt is received through the first holes, a second bolt is received through the second holes, a third bolt is received through the third holes and a fourth bolt is received through the fourth holes.

A preferred exemplary caliper brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
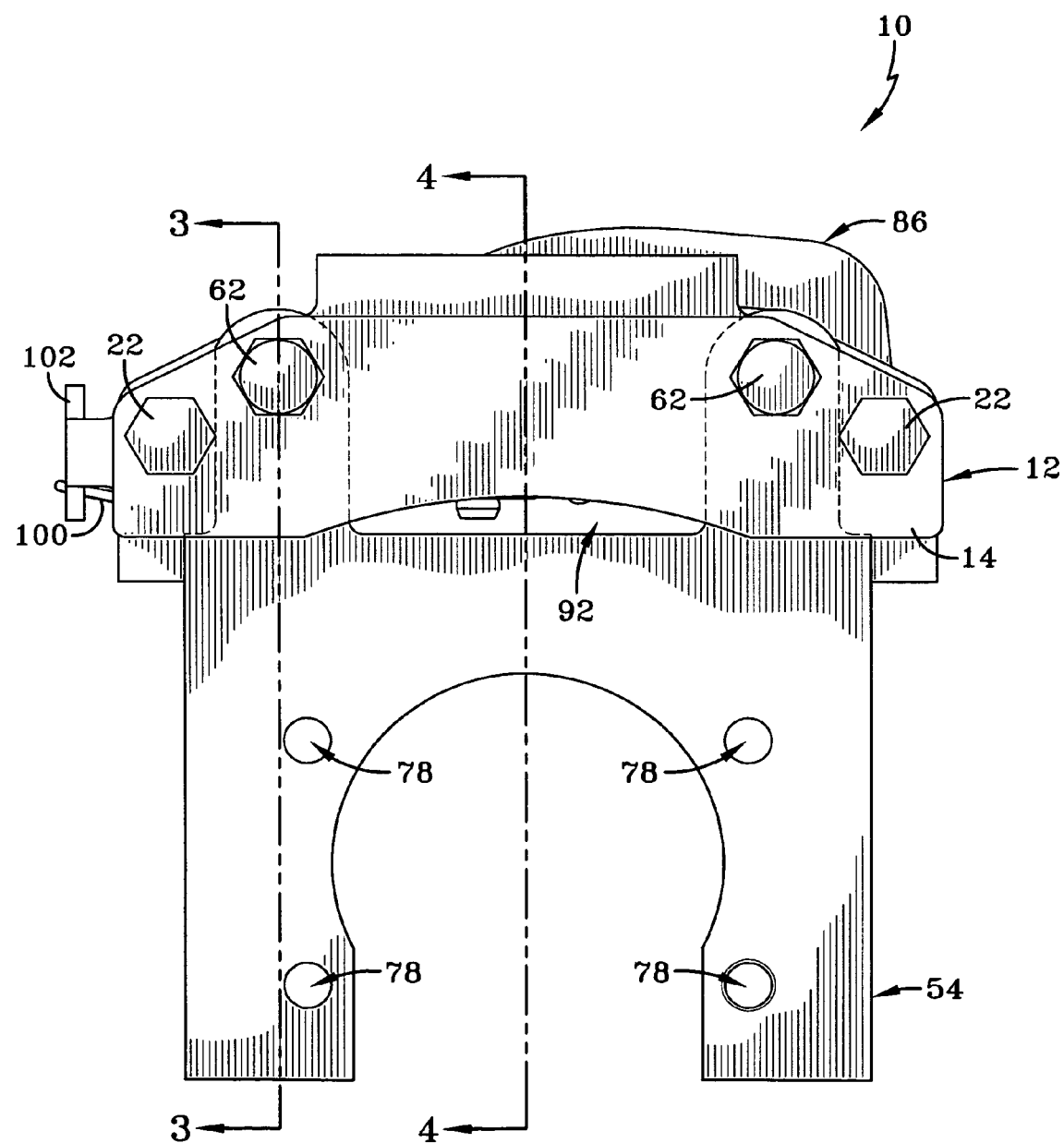
FIG. 1 is a side elevational view of a caliper brake according to the concepts of the present invention.

A caliper brake made in accordance with the present invention is indicated generally by the numeral 10. Caliper brake 10 includes a first stator assembly 12 having a stator plate 14 and a brake pad 16 secured thereto, as is well known in the art. The stator plate 14 is used to mount the stator assembly 12, and the brake pad 16 has a high friction surface and is used to provide a braking force. Stator plate 14 may have recesses or holes on each end that receive a pair of bolts 18 and 20, thereby mounting first stator assembly 12 relative to the other brake components. Bolts 18, 20 both include a hex head 22 that is larger in diameter than the recess or holes in stator plate 14, thereby preventing movement of stator plate 14 relative to bolts 18 and 20 in one direction.

Figure 2:
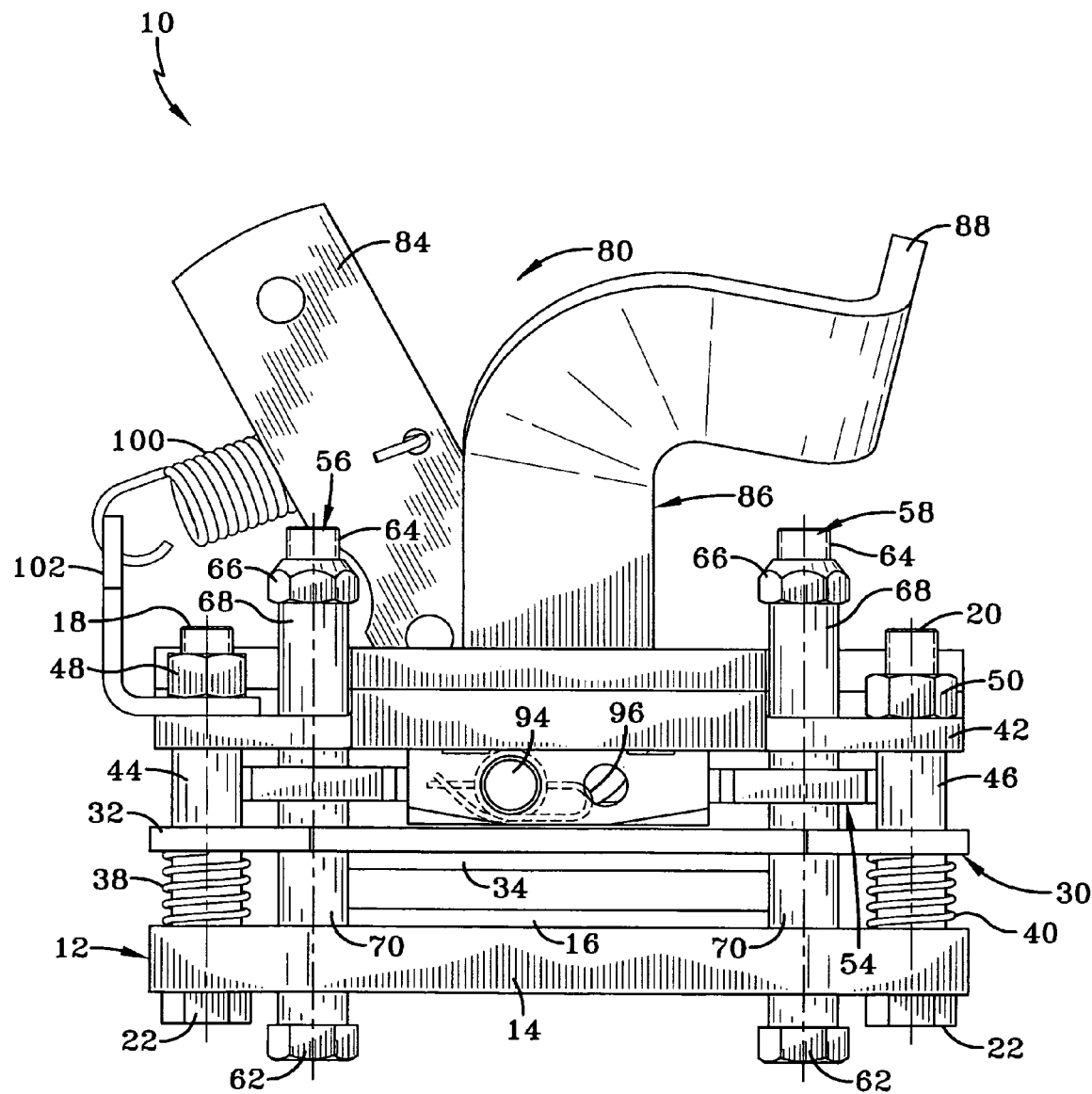
FIG. 2 is a top plan view of the caliper brake of FIG. 1.
Figure 3:
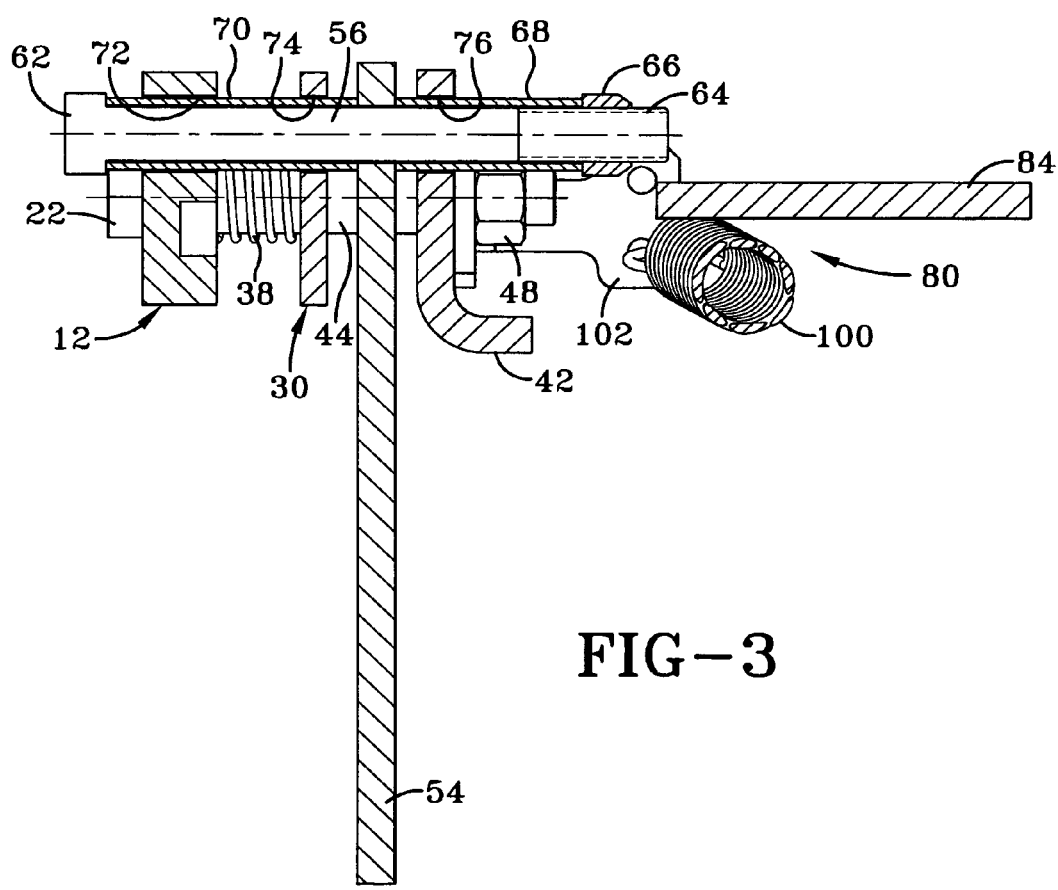
FIG. 3 is a sectional view taken substantially along line 3-3 of FIG. 1.
Figure 4:
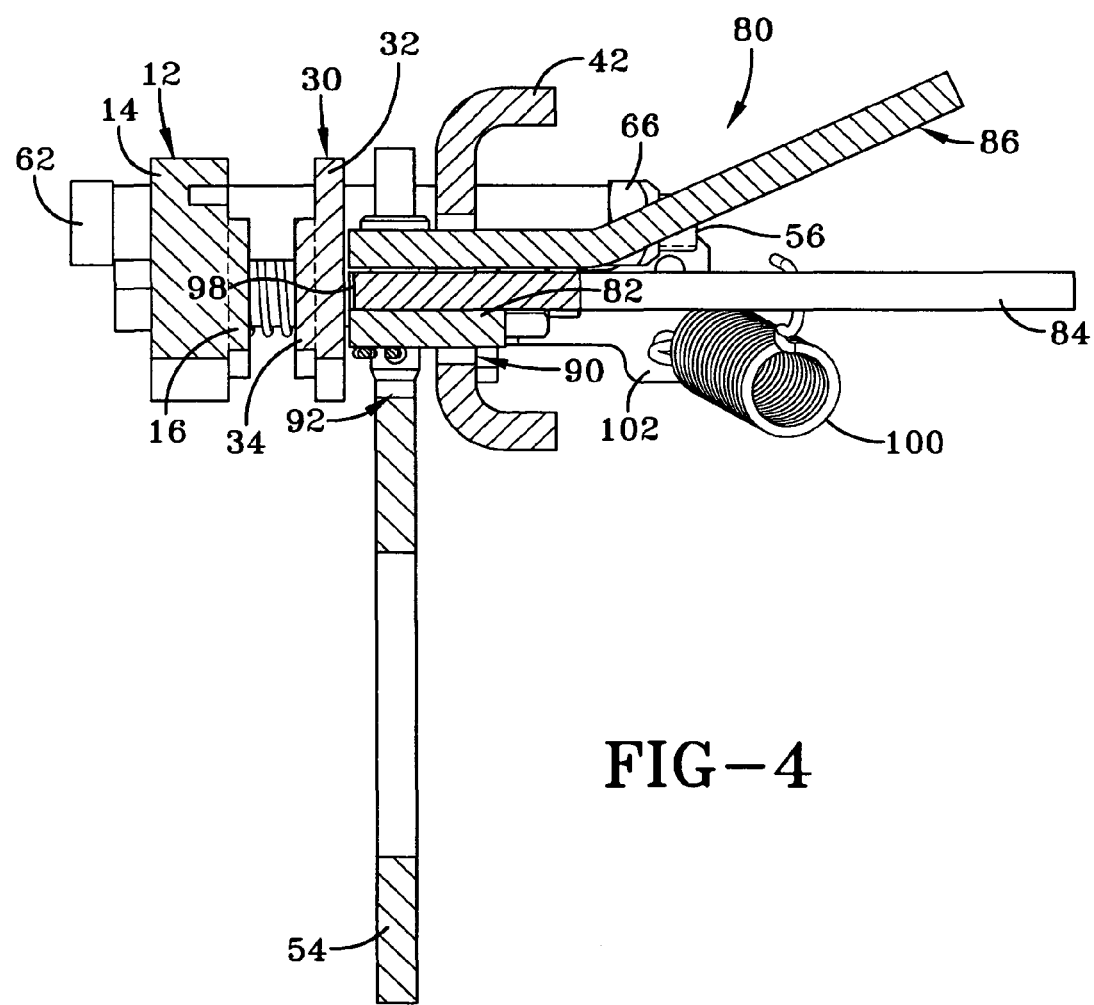
FIG. 4 is a sectional view taken substantially along line 4-4 of FIG. 1.
Figure 5:
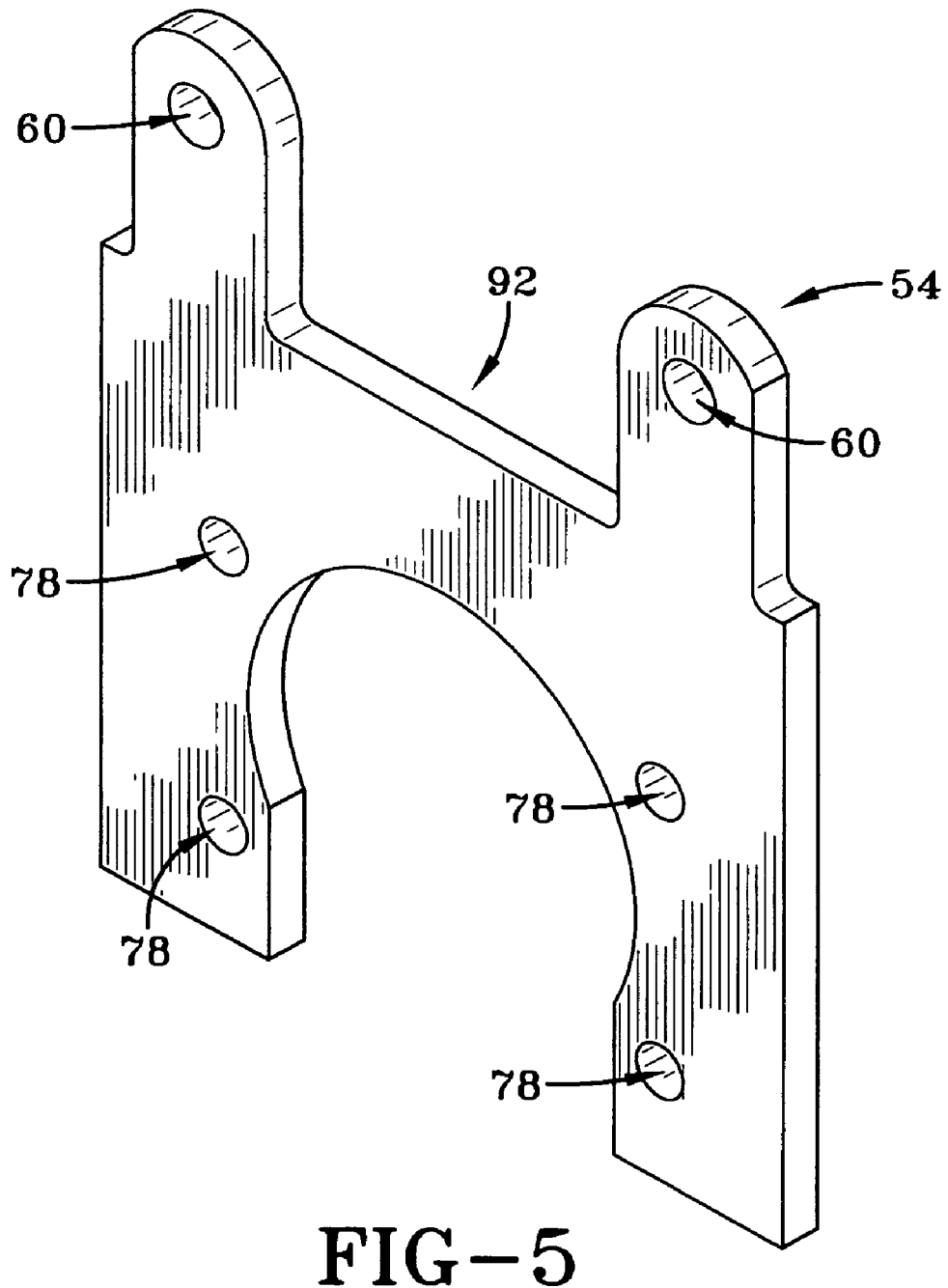
FIG. 5 is a perspective view of a mounting bracket according to the concepts of the present invention.

A second stator assembly, 30 which is substantially similar to first stator assembly 12, includes a stator plate 32, a brake pad 34, and recesses or holes at each end to receive bolts 18, 20. First brake pad 16 faces inward away from hex heads 22, and second brake pad 34 faces first brake pad 16 and is displaced therefrom (FIGS. 2 and 4). As is well known in the art, a rotating member of the vehicle is positioned between first brake pad 16 and second brake pad 34 when the brake 10 is installed on the vehicle.

A compression spring 38 is positioned on bolt 18 between first stator assembly 12 and second stator assembly 30, and a compression spring 40 is positioned on bolt 20 between first stator assembly 12 and second stator assembly 30. Compression springs 38, 40 act to bias the caliper brake 10 in an unactuated position. Specifically, due to the position of first stator assembly 12 adjacent to and in contact with hex heads 22 of bolts 18, 20, compression springs 38, 40 act to force second stator assembly 30 away from first stator assembly 12.

A stationary plate 42 is secured on bolts 18, 20, and is displaced from second stator assembly 30 in a direction opposite first stator assembly 12 by a spacer 44, 46 positioned over bolts 18, 20, respectively. As will be appreciated by those skilled in the art, stationary plate 42 includes holes adapted to receive bolts 18, 20 therethrough. The holes in stationary plate 42 have a diameter approximately equal to but slightly greater than the outside diameter of bolts 18, 20. Spacers 44, 46 are generally cylindrical in shape and have an inside diameter approximately equal but slightly greater than the outside diameter of bolts 18, 20. Thus, spacers 44, 46 fit over bolts 18, 20 respectively while restricting movement of stationary plate 42 and second stator assembly 30. A hex nut 48, 50 is provided on each bolt 18, 20 to secure stationary plate 42 thereon.

A mounting bracket generally indicated by the numeral 54 is secured to caliper brake 10 by a pair of mounting bolts 56, 58 extending through caliper brake 10 and oriented generally parallel to bolts 18, 20. Mounting bracket 54 includes a pair of holes 60 adapted to receive mounting bolts 56, 58 therethrough. Holes 60 have a diameter that is approximately equal to but slightly larger than the outer diameter of mounting bolts 56, 58. Each mounting bolt 56, 58 includes a hex head 62 at one end, and a threaded portion 64 adapted to receive a hex nut 66 at the opposite end.

An inward spacer 68 is positioned over each mounting bolt 56, 58 between mounting bracket 54 and hex nut 66. Similarly, an outward spacer 70 is positioned over mounting bolts 56, 58 between hex head 62 and mounting bracket 54. Both inward spacer 68 and outward spacer 70 have an inner diameter that is approximately equal to but slightly larger than the outer diameter of mounting bolts 56, 58. As will be appreciated by those skilled in the art, inward spacer 68 and outward spacer 70 restrict movement of mounting bracket 54 axially along mounting bolts 56, 58.

First stator assembly 12, second stator assembly 30 and stationary plate 42 each include holes 72, 74 and 76, respectively, that are adapted to receive mounting bolts 56, 58 and inward spacer 68 or outward spacer 70 therethrough. Holes 72, 74, 76 have a diameter that is approximately equal to but slightly greater than the outside diameter of the inward spacer 68 or outward spacer 70 positioned therein. The mounting bracket assembly, including mounting bolts 56, 58, inward spacers 68 and outward spacers 70, allows mounting bracket 54 to be positioned centrally within caliper brake 10, while the extended length of inward spacers 68 and outward spacers 70 help to prevent deflection or "drooping" of the brake. Mounting bracket 54 also includes a plurality of holes 78 to facilitate mounting of caliper brake 10 to a vehicle.

It is contemplated that any known actuating mechanism may be utilized with caliper brake 10. For example, hydraulic actuating mechanisms, ball-ramp actuating mechanisms and cam actuating mechanisms may be employed without deviating from the scope of the invention. The embodiment of the caliper brake shown in the drawings and described herein includes a cam actuating assembly generally indicated by the numeral 80. Actuating assembly 80 is engaged with an actuating cable (not shown) and is selectively actuated to cause axial movement of second stator assembly 30 along bolts 18, 20, thereby generating a braking force.

Actuating assembly 80 includes a pivot plate 82, an actuating lever 84 and a cable bracket 86 having a cable retaining flange 88. Actuating assembly 80 is received in an opening 90 through stationary plate 42. Opening 90 is substantially horizontally aligned with a mounting bracket opening 92 to facilitate actuation of the caliper brake 10. Opening 90 in stationary plate 42 may have a generally square profile, and may include slots extending from each side of the opening at the approximate vertical center to accommodate movement of actuating lever 84 and to facilitate assembly of actuating assembly 80. An actuating assembly suitable for use with caliper brake 10 is disclosed in co-pending patent application Ser. No. 12/321,586, which is incorporated herein by reference for whatever details are necessary to understand the actuating assembly. The components and operation of the actuating assembly 80 will therefore only be discussed briefly.

Actuating lever 84 is positioned above and in contact with pivot plate 82, and cable bracket 86 is positioned above and in contact with actuating lever 84. Pivot plate 82, actuating lever 84 and cable bracket 86 are connected by a clevis pin 94 extending through pivot apertures in each of pivot plate 82, actuating lever 84 and cable bracket 86. As is well known to those skilled in the art, clevis pin 94 allows rotation of the connected parts about the axis of the pin. A cotter pin 96 is inserted through a hole in clevis pin 94 to keep the clevis pin in place after assembly of the parts. Thus, pivot plate 82, actuating lever 84 and cable bracket 86 are prevented from moving relative to one another except for rotational movement about clevis pin 94. Once assembled and secured within opening 90 of stationary plate 42, however, pivot plate 82 and cable bracket 86 engage stationary plate 42 and are prevented from pivoting relative thereto. Therefore, only actuating lever 84 is able to pivot about clevis pin 94.

The actuating cable is received through an opening in cable retaining flange 88 and is connected at its extreme end to actuating lever 84. Actuation of the actuation cable causes actuating lever 84 to pivot relative to cable bracket 86. A cam surface 98 is provided at the end of actuating lever 84 adjacent second stator assembly 30. When actuating lever 84 pivots relative to cable bracket 86, cam surface 98 engages second stator assembly 30 and causes it to move axially along bolts 18, 20 toward first stator assembly 12. Movement of second stator assembly 30 toward first stator assembly 12 causes brake pads 16, 34 to engage the rotor of the vehicle, thereby inducing a braking effect. A spring 100 may be connected to actuating lever 84 and a spring bracket 102 to bias actuating assembly 80 in an unactuated position. Spring bracket 102 may be secured to caliper brake 10 by hex nut 48 on bolt 18.

It is thus evident that a caliper brake constructed as described herein accomplishes the objects of the present invention and otherwise substantially improves the art.

What is claimed is:

1. A caliper brake comprising a first stator assembly; a second stator assembly axially spaced from said first stator assembly; a mounting bracket axially spaced from said second stator assembly in a direction opposite said first stator assembly; a stationary plate axially spaced from said mounting bracket in a direction opposite said second stator assembly; laterally spaced first and second holes in each of said first and second stator assemblies and said stationary plate; laterally spaced third and fourth holes through each of said first and second stator assemblies, said mounting bracket and said stationary plate; a first bolt received through said first holes; a second bolt received through said second holes; a third bolt received through said third holes; and a fourth bolt received through said fourth holes; said first, second, third and fourth bolts including a head on one end and a threaded portion on an opposing end, a nut being secured over each threaded portion; an inner spacer positioned on each of said third and fourth bolts between said mounting bracket and said nuts; and an outer spacer positioned on each of said third and fourth bolts between said mounting bracket and said head of said bolts; said inner spacers extending through said third and fourth holes in said stationary plate and said outer spacers extending through said third and fourth holes in said first and second stator assemblies.

2. The caliper brake of claim 1, wherein each said inner spacer spans substantially all of the axial distance between said mounting bracket and said nut.

3. The caliper brake of claim 1, wherein each said outer spacer spans substantially all of the axial distance between said mounting bracket and said head of said bolt.

4. The caliper brake of claim 1, wherein said third and fourth bolts have an outside diameter and said laterally spaced third and fourth holes through said mounting bracket have a diameter approximately equal to but slightly greater than the outside diameter of said third and fourth bolts.

5. The caliper brake of claim 1, wherein said stationary plate is displaced from said second stator assembly in a direction opposite said first stator assembly.

6. The caliper brake of claim 1, wherein said first and second stator assemblies include a stator plate and a brake pad.

7. The caliper brake of claim 1, further comprising an actuating assembly that engages said second stator assembly.

8. The caliper brake of claim 1, further comprising a compression spring positioned on each of said first and second bolts between said first and second stator assemblies.

* * * * *